United States Patent
Hoge et al.

(10) Patent No.: US 11,871,725 B2
(45) Date of Patent: Jan. 16, 2024

(54) ATTACHMENT DEVICE FOR AN ANIMAL CRATE

(71) Applicant: Diggs Inc., Long Island City, NY (US)

(72) Inventors: Greg Hoge, Ridgewood, NY (US); Isaac Haverlick, Jersey City, NJ (US); Zel Crampton, Brooklyn, NY (US); Courtney Armstrong, Astoria, NY (US)

(73) Assignee: Diggs Inc., Long Island City, NY (US)

( * ) Notice: Subject to any disclaimer, the term of this patent is extended or adjusted under 35 U.S.C. 154(b) by 0 days.

(21) Appl. No.: 17/725,463

(22) Filed: Apr. 20, 2022

(65) Prior Publication Data

US 2023/0337627 A1    Oct. 26, 2023

(51) Int. Cl.
*A01K 1/035*  (2006.01)

(52) U.S. Cl.
CPC ................... *A01K 1/0356* (2013.01)

(58) Field of Classification Search
USPC ....... 119/454, 456, 464, 465, 466, 467, 468, 119/475, 477; D30/119, 133, 132, 129, D30/121
See application file for complete search history.

(56) References Cited

U.S. PATENT DOCUMENTS

| | | | | |
|---|---|---|---|---|
| 305,029 | A * | 9/1884 | Tutt | F16F 1/128 267/74 |
| 340,116 | A * | 4/1886 | Hinman | |
| 367,395 | A * | 8/1887 | Hinman | |
| 1,113,816 | A * | 10/1914 | Nolan | A01K 39/0106 119/466 |
| 1,537,615 | A * | 5/1925 | Mcconnell | A01K 39/0106 D30/133 |
| 1,555,038 | A * | 9/1925 | Thweatt | A47B 31/06 5/118 |
| 1,820,802 | A * | 8/1931 | Hill | A01K 39/0106 40/658 |

(Continued)

FOREIGN PATENT DOCUMENTS

CN    107080437 A    8/2017

OTHER PUBLICATIONS

MidWest Stainless Steel Snap'y Fit Dog Kennel Bowl; https://www.chewy.com/midwest-stainless-steel-snapy-fit-dog/dp/50141?utm_source=google-product&utm_medium=cpc&utm_campaign=hg&utm_content=MidWest&utm_term=&gclid=CjwKCAjwvuGJBhB1EiwACU1AiV1Rw2tX7M4HTLZs86CiranXqg3vSiESOBjmD9-M-bRGNJSfPK4LIRoCbZ4QAvD_BwE.

(Continued)

*Primary Examiner* — Andrea M Valenti
(74) *Attorney, Agent, or Firm* — Kilpatrick Townsend & Stockton LLP

(57) ABSTRACT

Described are attachment devices coupleable to an animal crate having at least a portion of at least one wall formed from a mesh network having a plurality of openings. The attachment device comprising includes a base member and a spring-loaded crate attachment member coupled to the base member. The spring-loaded crate attachment member includes a first slider piece and a second slider piece. A first force is applicable to at least one of the first slider piece or the second slider piece to move the at least one of the first slider piece or the second slider piece to an insertion state. A spring force biases the at least one of the first slider piece or the second slider piece from the insertion state to an expanded state.

14 Claims, 9 Drawing Sheets

(56) References Cited

U.S. PATENT DOCUMENTS

| | | | | |
|---|---|---|---|---|
| 1,886,015 | A * | 11/1932 | Henning | A01K 39/0106 24/562 |
| 1,961,171 | A * | 6/1934 | Sanford | A01K 31/12 119/468 |
| 2,535,563 | A * | 12/1950 | Boyer | A47G 19/10 248/231.41 |
| 2,693,226 | A * | 11/1954 | Schweighart | A47C 7/62 248/231.81 |
| 2,981,513 | A * | 4/1961 | Brown | F16L 3/127 248/222.12 |
| 3,789,800 | A * | 2/1974 | Steudler, Jr. | A01K 1/0356 248/222.12 |
| 4,118,003 | A * | 10/1978 | Dillow | F16M 13/022 248/539 |
| 4,527,821 | A * | 7/1985 | Tanaka | E05C 19/06 292/DIG. 31 |
| 4,930,819 | A * | 6/1990 | Sharp | E05C 1/04 292/42 |
| 5,467,733 | A | 11/1995 | Messina | |
| 5,551,737 | A * | 9/1996 | Clavin | E05B 83/30 292/DIG. 37 |
| 5,738,042 | A | 4/1998 | King | |
| 5,855,184 | A | 1/1999 | Eichler et al. | |
| 6,199,510 | B1 * | 3/2001 | Louden | A01K 39/014 119/51.01 |
| 6,283,512 | B1 * | 9/2001 | Butterbaugh | F16B 5/065 292/87 |
| 6,390,022 | B1 | 5/2002 | Eichler et al. | |
| 7,188,584 | B1 | 3/2007 | Wright | |
| 7,837,166 | B2 * | 11/2010 | Liao | F16M 13/00 24/523 |
| 9,581,180 | B2 * | 2/2017 | Lien | F16B 2/10 |
| 10,376,059 | B1 | 8/2019 | Ebersole et al. | |
| 2001/0047767 | A1 * | 12/2001 | Pelletier | A01K 1/0356 119/72.5 |
| 2011/0018288 | A1 * | 1/2011 | Wang | E05C 19/022 292/341.17 |
| 2017/0068147 | A1 * | 3/2017 | Truesdale | G03B 17/561 |
| 2017/0313260 | A1 * | 11/2017 | Minn | B60R 11/02 |
| 2018/0163919 | A1 | 6/2018 | Eckhart | |
| 2022/0349432 | A1 * | 11/2022 | Gardner | F16B 21/12 |

OTHER PUBLICATIONS

Ethical Pet Stainless Steel Coop Cup Wire Hanger Kennel Pet Bowl; https://www.chewy.com/ethical-pet-stainless-steel-coop-cup/dp/56316?utm_source=google-product&utm_medium=cpc&utm_campaign=hg&utm_content=Ethical%20Pet&utm_term=&gclid=CjwKCAjwvuGJBhB1EiwACU1AifmnY4_wony06keNxtUxKuXcfOwvLeTq-akC23jfVcQmoB_3CUQDfBoC1gQQAvD_BwE.

Frisco Cage Crock, Gray, 20 Ounces; https://www.chewy.com/frisco-cage-crock-gray-20-ounces/dp/242562?utm_source=google-product&utm_medium=cpc&utm_campaign=hg&utm_content=Frisco&utm_term=&gclid=CjwKCAjwvuGJBhB1EiwACU1AiZ9f7Ue7iabWAQ8zm7qKxfzqznKkwvM4P3UBf9WvdYvPOc9raquoIRoCCbMQAvD_BwE.

Pet Durable Bowl Cage Bowl,Pet Food Water Removable Bowls with Bolt Holder Hanging Cage Coop Cup Non-Skid Feeder Set Double Diners Portable for Feeding Dogs Cats Birds; https://www.amazon.com/Durable-Removable-Hanging-Non-Skid-Portable/dp/B0749JXRHX/ref=pd_di_sccai_6/142-8278713-9560206?pd_rd_w=4fOE9&pf_rd_p=c9443270-b914-4430-a90b-72e3e7e784e0&pf_rd_r=5HAEK345QAC56HTCX0TN&pd_rd_r=2b9d33bf-1d14-47d8-a5a4-32982183786c&pd_rd_wg=hgR4U&pd_rd_i=B0749JXRHX&psc=1.

2 Pack Crate Dog Bowl, Removable & Slow Pet Cage Food Bowl Hanging Kennel Water Bowl and Water Feeder Coop Cup with Food Spoon for Puppy Medium Dogs Birds Ferret Cat; https://www.amazon.com/dp/B096HP7DHR/ref=sspa_dk_detail_4?psc=1&pd_rd_i=B096HP7DHR&pd_rd_w=95Y3n&pf_rd_p=887084a2-5c34-4113-a4f8-b7947847c308&pd_rd_wg=0MAH4&pf_rd_r=0V605EA30EJOZZ6S9XSM&pd_rd_r=ebff6fa7-e6cc-4574-b503-43331ec95c1b&spLa=ZW5jcnlwdGVkUXVhbGImaWyPUEyQ0NIUTFVUZE0VVINJmVuY3J5cHRIZElkPUEWODA5NDU3MjdCSUkwWTBFMDY3NSZIbmNyeXB0ZWRBZEIkPUEwOTUwMzM3MIM5RFIHNUM1UFRXRiZ3aWRnZXROYW1IPXNwX2RIdGFpbCZhY3Rpb249Y2xpY2tSZWRpcmVjdCZkb05vdExvZ0NsaWNrPXRydWU=.

Balacoo 2pcs Crate Dog Bowl Removable Wood Hanging Water Food Feeder Bowl Ceramic Cage Coop Cup Cat Food Container for Cat Puppy Bird Pets White WOD Color; https://www.amazon.com/Balacoo-Removable-Hanging-Ceramic-Container/dp/B092CTHN8B/ref=sr_1_102?dchild=1&keywords=crate+bowl&qid=1631117218&s=pet-supplies&sr=1-102.

Petmate Double Diner Kennel Bowl; https://www.amazon.com/Petmate-Double-Diner-Kennel-Bowl/dp/B0733DCZQL/ref=sr_1_110?dchild=1&keywords=crate+bowl&qid=1631117269&s=pet-supplies&sr=1-110.

Guardians Crate Dog Bowl, Removable Stainless Steel Water Food Feeder Bowls Cage Coop Cup for Cat Puppy Bird Pets; https://www.amazon.com/dp/B085VJSJDQ/ref=sspa_dk_detail_0?psc=1&pd_rd_i=B085VJSJDQ&pd_rd_w=v54aD&pf_rd_p=887084a2-5c34-4113-a4f8-b7947847c308&pd_rd_wg=BKlaY&pf_rd_r=0CFRR5FT8G1B9XBWRZD1&pd_rd_r=718ff254-ce50-4a4c-bb63-244bce4f4563&spLa=ZW5jcnlwdGVkUXVhbGImaWVyPUFMTkxGOVVKS0UxR1UmZW5jcnlwdGVkSWQ9QTA4MTIzOTAyRVIJQTVZTkc0NKVUJmVuY3J5cHRIZEFKSWQ9QTA1NzgxMTFQSzM5UDM2SFhQUIlmd2lkZ2V0TmFtZT1zcF9kZXRhaWwmYWN0aW9uPWNsaWNrUmVkaXJlY3QmZG9Ob3RMb2dDbGljaz10cnVI.

Crate Dog Bowl, Removable Stainless Steel Water Food Feeder Bowls Cage Coop Cup for Cat Puppy Bird Pets; https://www.amazon.com/dp/B07V3BJDYF/ref=sspa_dk_detail_1?psc=1&pd_rd_i=B07V3BJDYF&pd_rd_w=0gMTd&pf_rd_p=887084a2-5c34-4113-a4f8-b7947847c308&pd_rd_wg=glU3W&pf_rd_r=QF6H1TNRXQQ7TRHWF6PD&pd_rd_r=d3edca8e-8229-4a71-8f68-97f3ea9b8412&smid=APVOPIIJWBCD3&spLa=ZW5jcnlwdGVkUXVhbGImaWVyPUFSNzE1UIBQQ1hBT0gmZW5jcnlwdGVkSWQ9QTEwMDg2MzNZWTQxTURRSDhNSEMmZW5jcnlwdGVkQWRJZD1BMDA1MjMzMTFSMVIRSEQwQ0tJRTUmd2lkZ2V0TmFtZT1zcF9kZXRhaWwmYWN0aW9uPWNsaWNrUmVkaXJlY3QmZG9Ob3RMb2dDbGljaz10cnVI.

YoneKiera Detached Crate Dog Bowl, Removable Hanging Pet Cage Bowl Water Food Feeder with Clip Cage Coop Cup, for Puppy Small Dogs Cats Birds Rats Guinea Pigs; https://www.amazon.com/YoneKiera-Detached-Removable-Hanging-Feeder/dp/B091CYP9XV/ref=sr_1_77?dchild=1&keywords=crate+bowl&qid=1631116876&s=pet-supplies&sr=1-77.

Hamiledyi Removable Stainless Steel Hanging Bowls for Dog, Dog Crate Water & Food Bowl, Puppy Feeder Dish Non-Spill Coop Cup for Dog Cat Puppy Kitten Rabbits; https://www.amazon.com/Hamiledyi-Removable-Feeder-Stainless-Hanging-Suitable/dp/B08N5SGRR9/ref=sr_1_122?dchild=1&keywords=crate+bowl&qid=1631117269&s=pet-supplies&sr=1-122.

PCT/US2023/019091, "International Search Report and Written Opinion", dated Aug. 21, 2023, 16 pages.

* cited by examiner

ATTACHMENT DEVICE FOR AN ANIMAL CRATE

FIELD OF THE INVENTION

The present disclosure relates to the pet industry generally and more specifically to pet crates and attachment devices for pet crates.

BACKGROUND

Animal enclosures or crates for pets often include a mesh, portals, caging, or other assembly that allows light to propagate through the crate. Occasionally, it is desirable to include items or devices within the crate to allow the animal to eat, to drink, to provide a sense of security to the animal, to be monitored, or any other reason. Thus, it may be desirable to produce an attachment device for securing the items or devices to the crate that is safe for the animal, easy to install and remove, and aesthetically pleasing.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, disclosed herein is an attachment device coupleable to an animal crate having at least a portion of at least one wall formed from a mesh network having a plurality of openings, the attachment device comprising: a base member; and a spring-loaded crate attachment member coupled to the base member and comprising a first slider piece and a second slider piece, wherein a first force is application to at least one of the first slider piece or the second slider piece to move the at least one of the first slider piece or the second slider piece to an insertion state, and wherein a spring force biases the at least one of the first slider piece or the second slider piece from the insertion state to an expanded state.

In some embodiments, a shape of the spring-loaded crate attachment member substantially corresponds to a shape of at least one of the plurality of openings.

In certain embodiments, the spring-loaded crate attachment member is insertable through at least one of the plurality of openings when the at least one of the first slider piece or the second slider piece are in the insertion state.

In some embodiments, the spring-loaded attachment member is spaced at a distance from the base member substantially equal to a width of a rod forming the mesh network.

In certain embodiments, a cross-section of a first portion of each of the first slider piece and the second slider piece is greater than a cross-section of a second portion of each of the first slider piece and the second slider piece.

In some embodiments, the first portion is at a first end of each of the first slider piece and the second slider piece, the second portion is at a second end of each of the first slider piece and the second slider piece, and the first end is located closer to the base member than the second end.

In certain embodiments, the base member is coupleable to an animal crate enrichment device.

According to certain embodiments of the present invention, disclosed herein is a method for coupling an attachment device to an animal crate having at least a portion of at least one wall formed from a mesh network having a plurality of openings, the attachment device comprising a base member and a spring-loaded crate attachment member coupled to the base member and comprising a first slider piece and a second slider piece, the method comprising: applying a first force to the at least one of the first slider piece or the second slider piece; moving at least one of the first slider piece or the second slider piece to an insertion state due to the application of the first force; and biasing the at least one of the first slider piece or the second slider piece from the insertion state to an expanded state due to a spring force.

In some embodiments, a shape of the spring-loaded crate attachment member substantially corresponds to a shape of at least one of the plurality of openings.

In certain embodiments, the method further comprises inserting the spring-loaded crate attachment member when the at least one of the first slider piece or the second slider piece are in the insertion state through at least one of the plurality of openings until the base member abuts at least one rod forming the mesh network.

In some embodiments, the spring-loaded attachment member is spaced at a distance from the base member substantially equal to a width of the at least one rod.

In certain embodiments, a cross-section of a first portion of each of the first slider piece and the second slider piece is greater than a cross-section of a second portion of each of the first slider piece and the second slider piece.

In some embodiments, the base member is coupleable to an animal crate enrichment device.

According to certain embodiments of the present invention, disclosed herein is an animal crate enrichment device coupleable to an animal crate having at least a portion of at least one wall formed from a mesh network having a plurality of openings, the animal crate enrichment device comprising: an attachment device comprising: a base member; and a spring-loaded crate attachment member coupled to the base member and comprising a first slider piece and a second slider piece, wherein a first force is applicable to at least one of the first slider piece or the second slider piece to move the at least one of the first slider piece or the second slider piece to an insertion state, and wherein a spring force biases the at least one of the first slider piece or the second slider piece from the insertion state to an expanded state.

In certain embodiments, a shape of the spring-loaded crate attachment member substantially corresponds to a shape of at least one of the plurality of openings.

In some embodiments, the spring-loaded crate attachment member is insertable through at least one of the plurality of openings when the at least one of the first slider piece or the second slider piece are in the insertion state.

In certain embodiments, the spring-loaded attachment member is spaced at a distance from the base member substantially equal to a width of a rod forming the mesh network.

In some embodiments, a cross-section of a first portion of each of the first slider piece and the second slider piece is greater than a cross-section of a second portion of each of the first slider piece and the second slider piece.

In certain embodiments, the first portion is at a first end of each of the first slider piece and the second slider piece, the second portion is at a second end of each of the first slider piece and the second slider piece, and the first end is located closer to the base member than the second end.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain aspects and features of the present disclosure relate to pet containment and attachment devices for pet crates. The embodiments of the present disclosure described below are not intended to be exhaustive or to limit the disclosure to the precise forms described herein. Rather, the embodiments described herein are chosen so that a person of skill in the art can appreciate and understand the principles and practices of the present disclosure.

Figure 1:
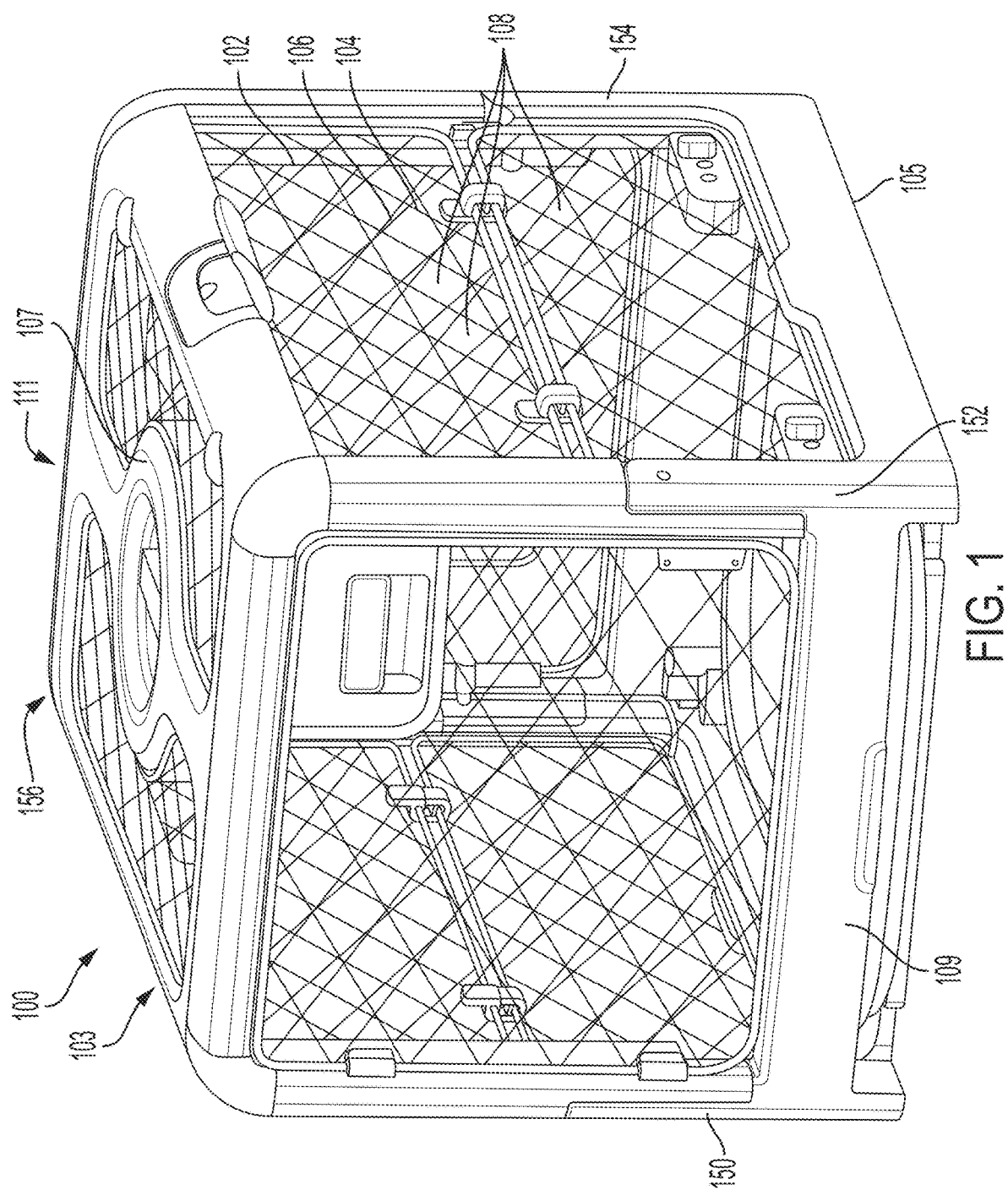
FIG. 1 is a front top perspective view of an animal crate according to certain aspects of the present disclosure.

A representative embodiment of an animal crate 100 that an attachment device may be coupled to is shown in FIG. 1. The animal crate 100 includes a bottom 105, a top 107, a front 109, a rear 111, a first wall 102, and a second wall 103. A support frame is defined by four vertical members extending upward from the bottom 105, including a first collapsible vertical member 150, a second collapsible vertical member 152, a third collapsible vertical member 154 and a fourth collapsible vertical member 156. The support frame is employed to support a mesh network 104 of rods 106 that form an enclosure of the animal crate 100. The mesh network 104 includes openings 108 between the rods 106. The openings 108 of the mesh network 104 may include diamond shaped openings, rounded openings, rectangular openings, or any other appropriate shape.

The animal crate 100 may include as many as six doors/openings. For example, the mesh network 104 disposed between the first collapsible vertical member 150 and the second collapsible vertical member 152 is a front door. Optionally, the mesh network 104 disposed between the third collapsible vertical member 154 and the fourth collapsible vertical member 156 may be a rear door. In addition, the mesh network 104 disposed between the second collapsible vertical member 152 and the third collapsible vertical member 154 is a first side door. The mesh network 104 disposed between the fourth collapsible vertical member 156 and the first collapsible vertical member 150 is a second side door.

Optionally, the mesh network 104 may be a collapsible mesh comprising a metal mesh, a steel cable mesh, a polymer mesh, or any suitable animal containment mesh, such that a door comprising a collapsible mesh can collapse vertically as a top of the animal crate 100 is lowered effectively compressing the first wall 102 and the second wall 103 vertically.

An attachment device 210 for attaching an animal crate enrichment device 216 to the mesh network 104 is shown in FIGS. 2A-3D. The attachment device 210 includes a base member 212, a connecting member 214, and a spring-loaded crate attachment member 220. A rear face of the base member 212 may be substantially rectangular, or any other suitable shape, and engage with the mesh network 104. The connecting member 214 may be used to removably couple a front face of the base member 212 to the animal crate enrichment device 216. The base member 212 may attach to the connecting member 214 via any suitable fastener (e.g., screws, bolts, rivets, or other mechanical or chemical fasteners), a snap-fit connection, a friction-fit connection, a magnetic connection, or any other suitable attachment mechanism. In some embodiments, the base member 212 may couple directly to the animal crate enrichment device 216. Additionally, the base member 212 may be integrally formed with the connecting member 214 and/or the animal crate enrichment device 216. Though the animal crate enrichment device 216 is shown as a bowl, it may be any suitable device for use with or by an animal in an animal crate. For example, the animal crate enrichment device 216 may be a bowl, water bottle, toy, camera, edible treat, treat dispenser, etc.

Figure 2B:
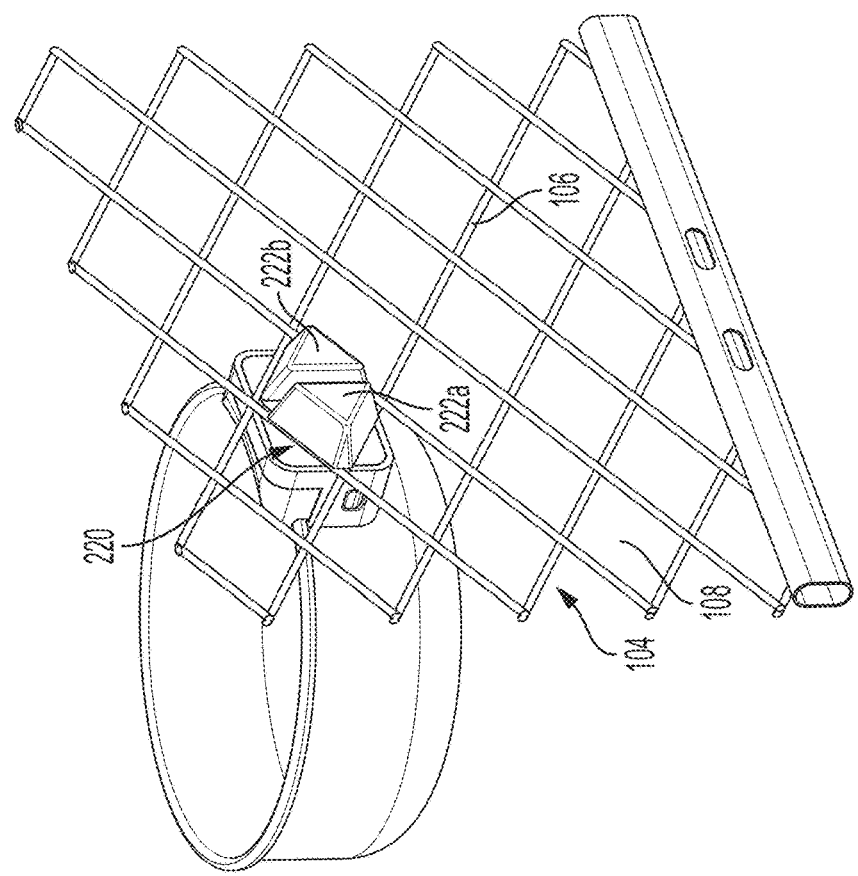
FIG. 2B is a front top perspective view of the attachment device of FIG. 2A coupled to the animal crate of FIG. 1 according to certain aspects of the present disclosure.
Figure 2A:
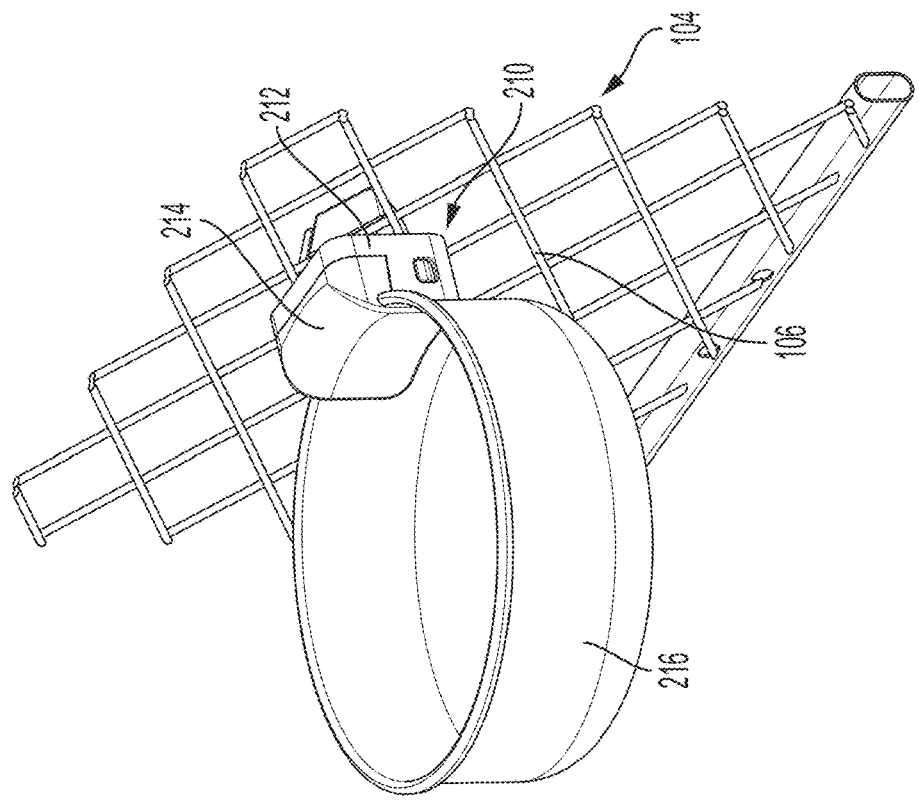
FIG. 2A is a rear top perspective view of an attachment device coupled to the animal crate of FIG. 1 according to certain aspects of the present disclosure.
Figure 2C:
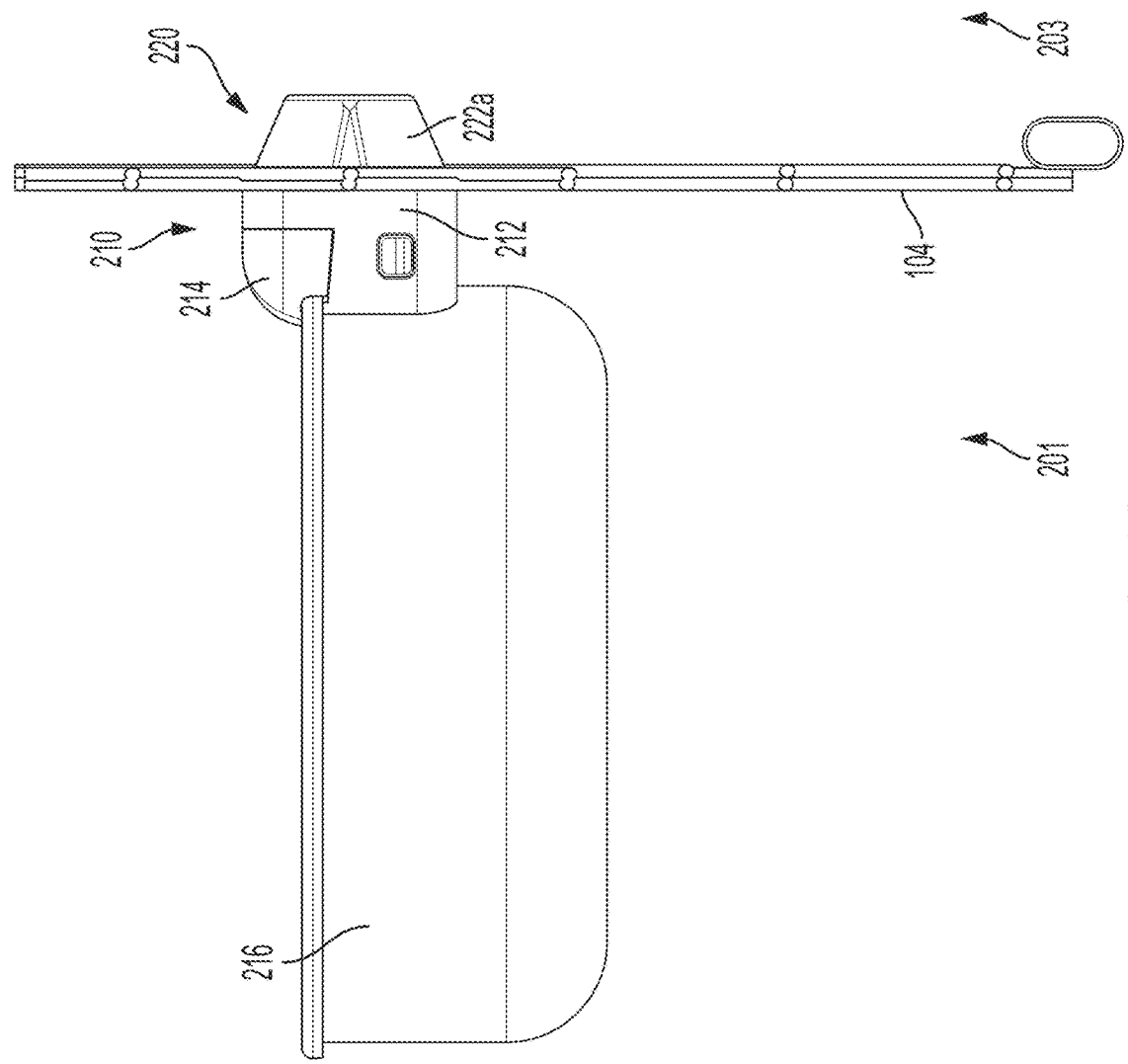
FIG. 2C is a side view of the attachment device of FIG. 2A coupled to the animal crate of FIG. 1 according to certain aspects of the present disclosure.

The spring-loaded crate attachment member 220 is coupled to the rear face of the base member 212. The spring-loaded crate attachment member 220 may be used to removably couple the attachment device 210 to the mesh network 104. The base member 212 may attach to the spring-loaded crate attachment member 220 via any suitable fastener (e.g., screws, bolts, rivets, or other mechanical or chemical fasteners), a snap-fit connection, a friction-fit connection, a magnetic connection, or any other suitable attachment mechanism. The spring-loaded crate attachment member 220 includes a first slider piece 222a and a second slider piece 222b. In some embodiments, the spring-loaded crate attachment member 220 is insertable through at least one the openings 108. A shape of the spring-loaded crate attachment member 220 substantially corresponds to a shape of at least one of the openings 108. That is, a front face of the spring-loaded crate attachment member 220 is similar to or the same as the shape of at least one of the openings 108. As illustrated in FIG. 2B, the spring-loaded crate attachment member 220 and the openings 108 are diamond shaped.

To insert the spring-loaded crate attachment member 220 through the opening 108, at least one of the first slider piece 222a and/or the second slider piece 222b may be moved into an insertion state (as shown and discussed further below in reference to FIG. 4C) so that the first slider piece 222a and the second slider piece 222b of the spring-loaded crate attachment member 220 are insertable through the opening 108. In some embodiments, the spring-loaded crate attachment member 220 is spaced at a distance from the base member 212 that is substantially equal to a width of the rod 106 of the mesh network 104 so that the rod(s) 106 may be positioned between the base member 212 and the spring-loaded crate attachment member 220 when the attachment device 210 is coupled to the mesh network 104. With the rod(s) 106 positioned between the base member 212 and the spring-loaded crate attachment member 220, the rod(s) 106 may abut the base member 212 so that the base member 212 is flush with an inner side 201 of the mesh network 104 and the spring-loaded crate attachment member 220 is flush with an outer side 203 of the mesh network 104.

The attachment device 210, or any combination of the various components forming the attachment device 210, may be formed of a polymer, a metal, a composite, or any combination thereof. The material selected for various components of the attachment device 210 may be selected based on safety requirements for pet products and to provide enhanced durability to the attachment device 210.

Figure 3A:
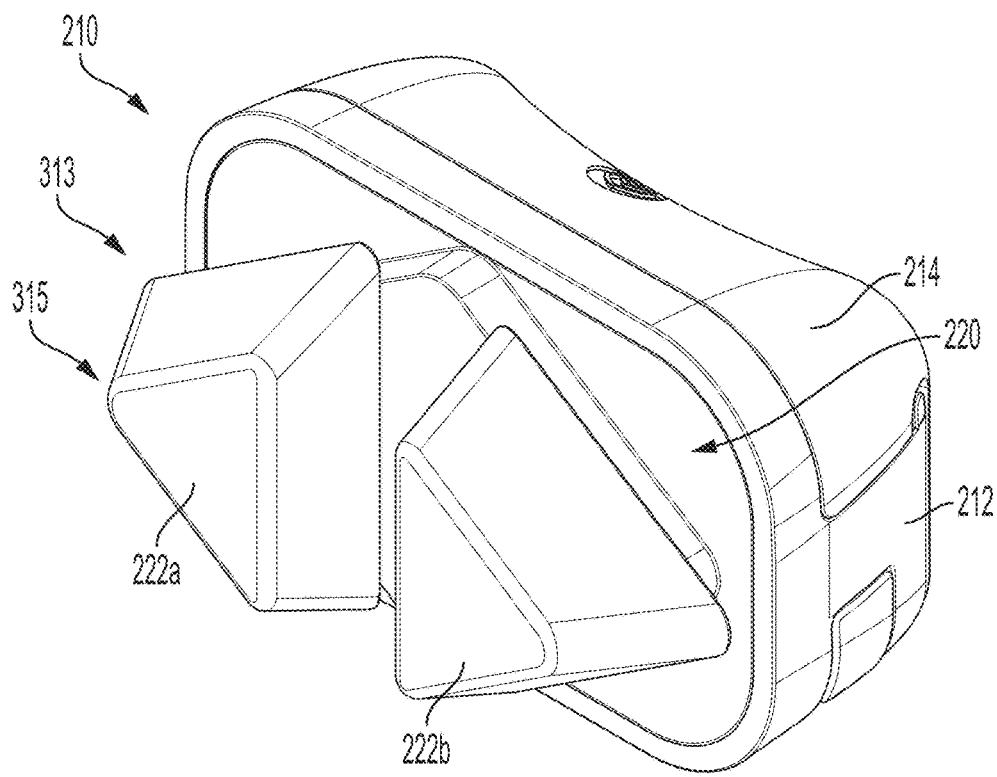
FIG. 3A is a front top perspective view of the attachment device of FIG. 2A according to certain aspects of the present disclosure.
Figure 3B:
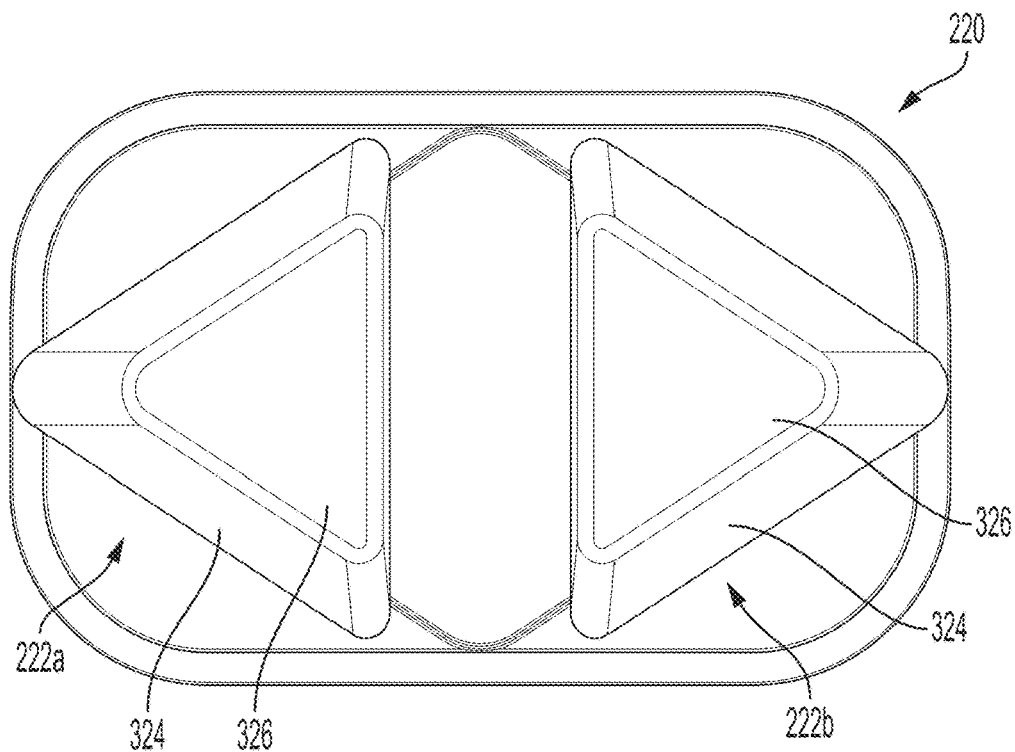
FIG. 3B is a front view of a spring-loaded crate attachment member of the attachment device of FIG. 2A according to certain aspects of the present disclosure.

Regarding FIGS. 3A-3D, the attachment device 210 may be the same or similar to the attachment device 210 described above with reference to FIGS. 2A-2C and may include the same or similar features. As shown in FIGS. 3A and 3B, a first end 313 of each of the first slider piece 222a and the second slider piece 222b may be located closer to the base member 212 than a second end 315. A first portion 324 of each of the first slider piece 222a and the second slider piece 222b may be arranged at or proximate to the first end 313, and a second portion 326 of each of the first slider piece 222a and the second slider piece 222b may be arranged at or proximate to the second end 315.

In some embodiments, a cross-section of the first portion 324 may be greater than a cross-section of the second portion 326. The cross-sections are planes extending through each of the first slider piece 222a and the second slider piece 222b that are parallel to the respective face of the first slider piece 222a and the second slider piece 222b at the second end 315. As such, with the first portion 324 at the first end 313 and the second portion 326 at the second end 315, each of the first slider piece 222a and the second slider piece 222b may have at least one side edge with a gradual incline between the first end 313 and the second end 315. In certain embodiments, each edge of the first slider piece 222a and the second slider piece 222b may feature the gradual incline. The gradual incline may enable a user to align the attachment device 210 with the opening 108 in the mesh network 104 when first inserting the first slider piece 222a and the second slider piece 222b through the opening 108.

Figure 3C:
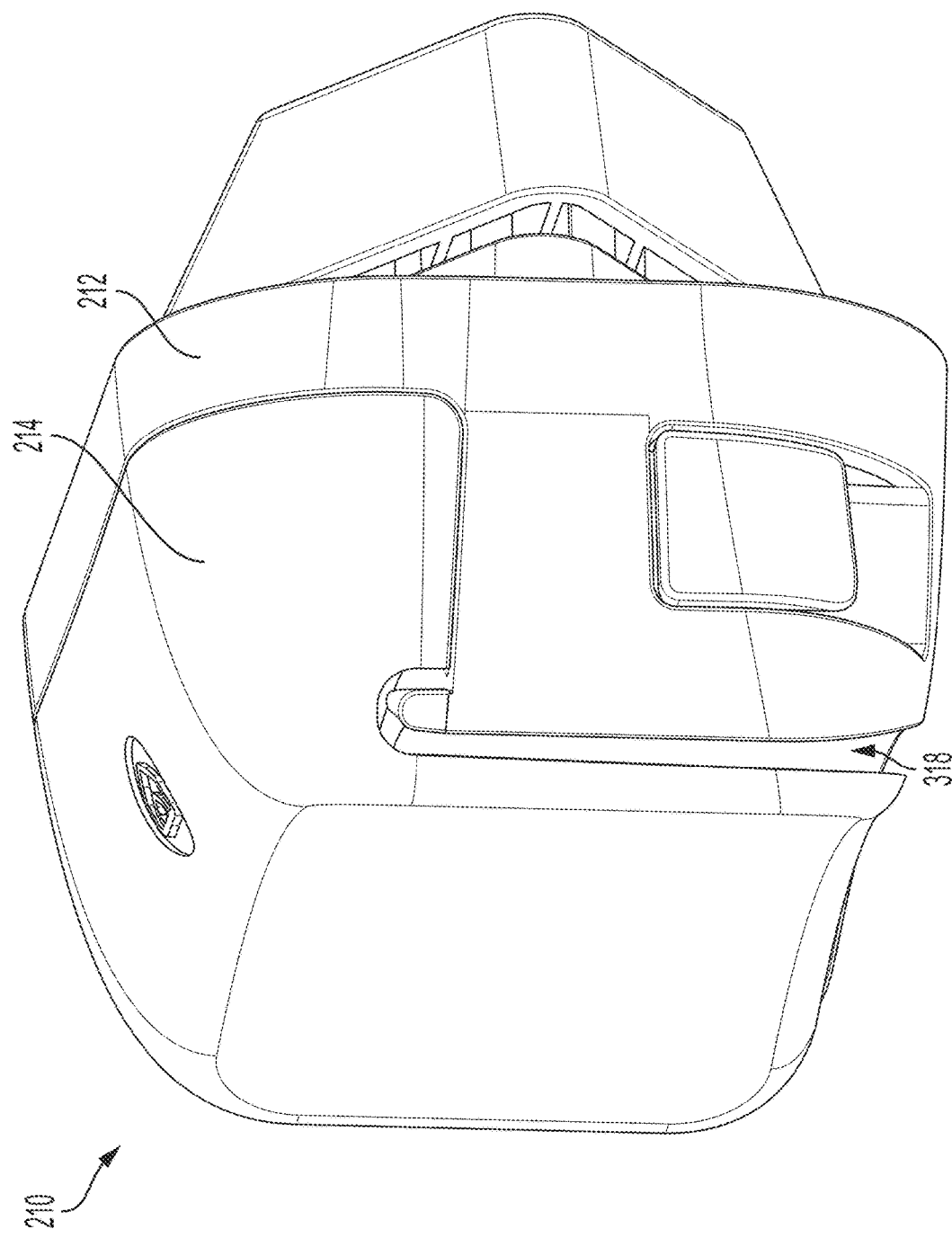
FIG. 3C is a side perspective view of the attachment device of FIG. 2A according to certain aspects of the present disclosure.

In some embodiments, as shown in FIG. 3C, a channel 318 may be formed in the attachment device 210 between the base member 212 and the connecting member 214 when the base member 212 is coupled to the connecting member 214. A shape and size of the channel 318 may correspond to a portion of the animal crate enrichment device 216 so that the portion of the animal crate enrichment device 216 fits within the channel 318 when the base member 212 and the connecting member 214 are coupled to the animal crate enrichment device 216, as may be seen in FIGS. 2A-2C. Thus, the attachment device 210 may be removably coupled to the animal crate enrichment device 216. For example, if the animal crate enrichment device is a bowl, the channel 318 may have a size and shape that corresponds to a width and a portion of a circumference of the bowl. In some examples, the connecting member 214 and/or the base member 212 may have another coupling mechanism other than the channel 318 for coupling the animal crate enrichment device 216 to the attachment device 210. As an example, the coupling mechanism may be threads for receiving a threaded screw of the animal crate enrichment device 216.

Figure 3D:
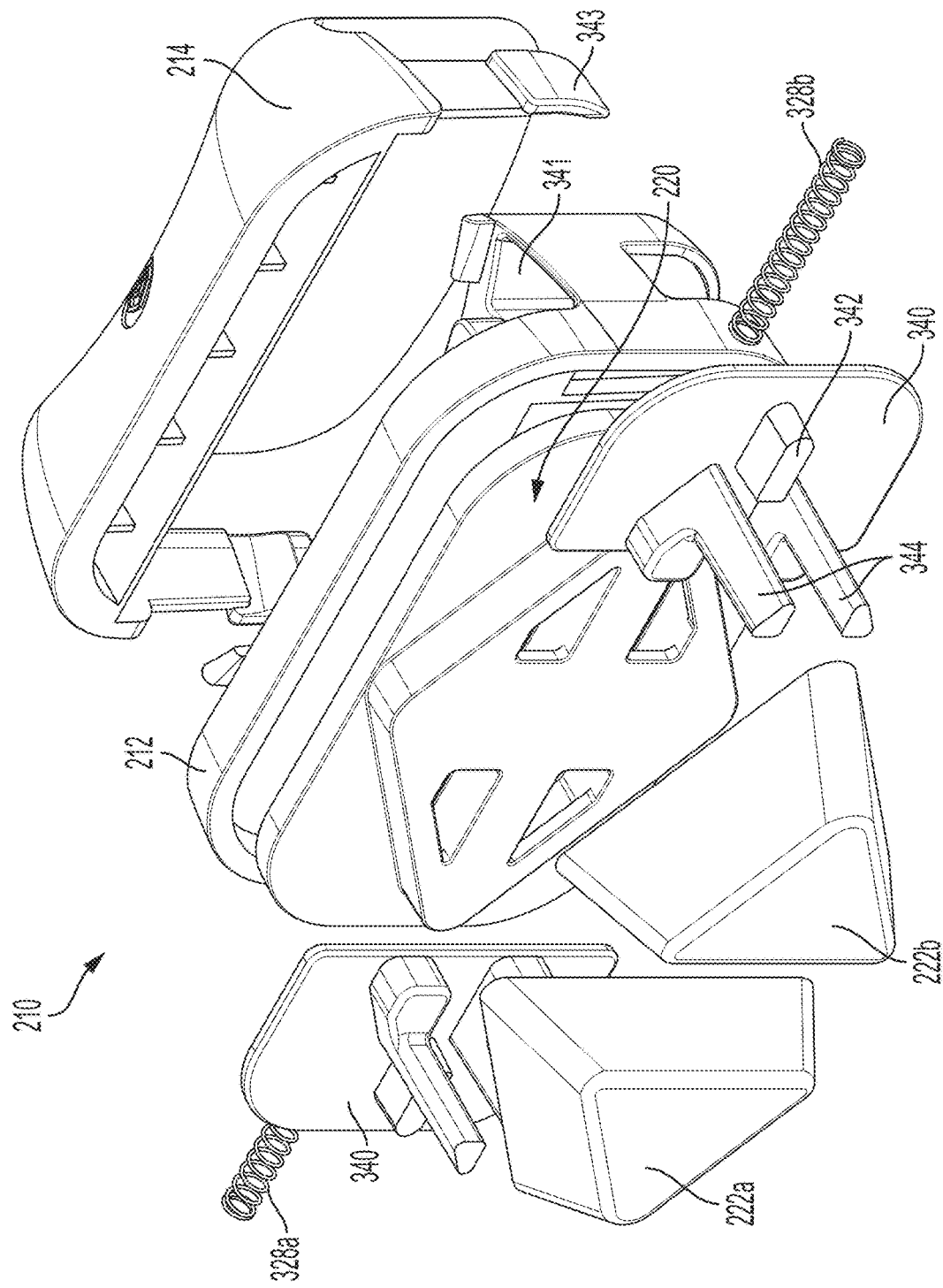
FIG. 3D is a perspective exploded view of the attachment device of FIG. 2A according to certain aspects of the present disclosure.

Exemplary internal components of the attachment device 210 are shown in FIG. 3D. In particular, the base member 212 includes a gap 341 in which a fin 343 of the connecting member 214 may be positioned within to couple the base member 212 to the connecting member 214. Other embodiments may include a different fastener for coupling the base member 212 to the connecting member 214. In addition, the spring-loaded crate attachment member 220 includes openings through which protrusions 344 of plates 340 can interface with an internal surface of each of the first slider piece 222a and the second slider piece 222b. The protrusions 344 may engage with the first slider piece 222a and the second slider piece 222b to couple the first slider piece 222a and the second slider piece 222b to the base member 212. In some embodiments, the spring-loaded crate attachment member 220 may include a single opening through which all of the protrusions 344 may extend.

The spring-loaded crate attachment member 220 includes springs 328a-b, with spring 328a being associated with the first slider piece 222a and spring 328b being associated with the second slider piece 222b. Each of the plates 340 can include a pusher 342 that engages with the springs 328a-b. When a force is applied by a user to either or both of the first slider piece 222a and the second slider piece 222b, the respective pusher 342 compresses the associated spring 328a-b, allowing the first slider piece 222a and/or the second slider piece 222b to move towards a center of the spring-loaded crate attachment member 220 and enter the insertion state. The gradual inclines of the edges of the first slider piece 222a and the second slider piece 222b may convert the force of the user pushing the spring-loaded crate attachment member 220 against the mesh network 104 into a force that causes the first slider piece 222*a* and the second slider piece 222*b* to move towards each other during insertion through the mesh network 104. A force applied to the first slider piece 222*a* may cause only the first slider piece 222*a* to move, or may result in both the first slider piece 222*a* and the second slider piece 222*b* moving towards the center of the spring-loaded crate attachment member 220.

Figure 4A:
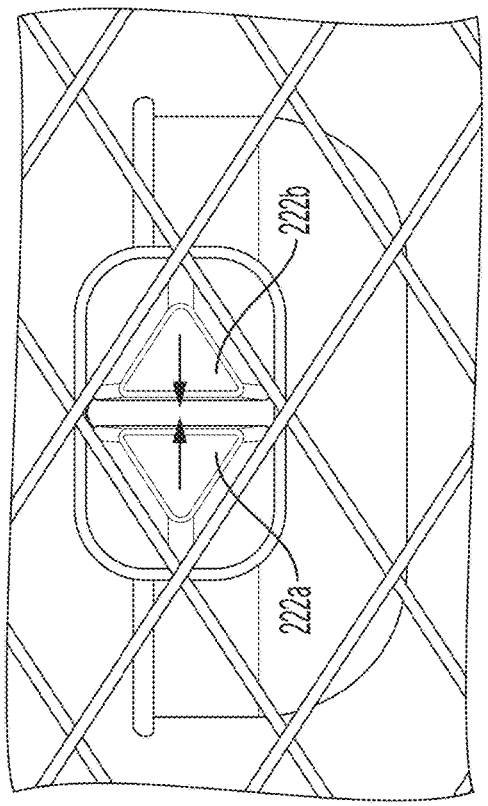
FIG. 4A is a front view of the attachment device of FIG. 2A before coupling to the animal crate of FIG. 1 according to certain aspects of the present disclosure.
Figure 4B:
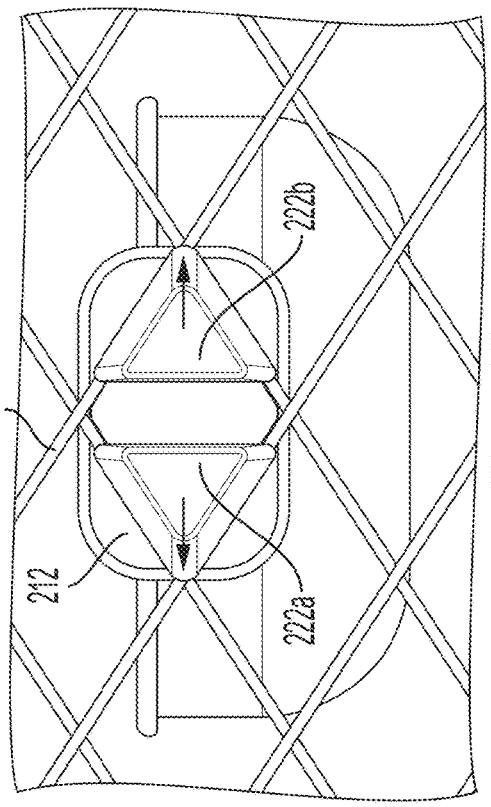
FIG. 4B is a front view of the attachment device of FIG. 2A during initial coupling to the animal crate of FIG. 1 according to certain aspects of the present disclosure.

Configurations of the spring-loaded crate attachment member 220 before, during, and after insertion through the mesh network 104 are shown in FIGS. 4A-5D. FIGS. 4A and 5A correspond to an initial configuration prior to the attachment device 210 being coupled to the mesh network 104. The spring-loaded crate attachment member 220 is in an expanded state in which the first slider piece 222*a* and the second slider piece 222*b* are not able to fit through the opening 108. A force can then be applied to the first slider piece 222*a* and/or the second slider piece 222*b* by pressing the edges of each of the first slider piece 222*a* and the second slider piece 222*b* against the rods 106 of the mesh network 104 to begin moving the first slider piece 222*a* and/or the second slider piece 222*b* to a partially-compressed insertion state, as shown in FIGS. 4B and 5B. In this configuration, the spring-loaded crate attachment member 220 may begin to be partially inserted through the opening 108. With continuation of the force, the first slider piece 222*a* and/or the second slider piece 222*b* move to a fully-compressed insertion state.

Figure 4C:
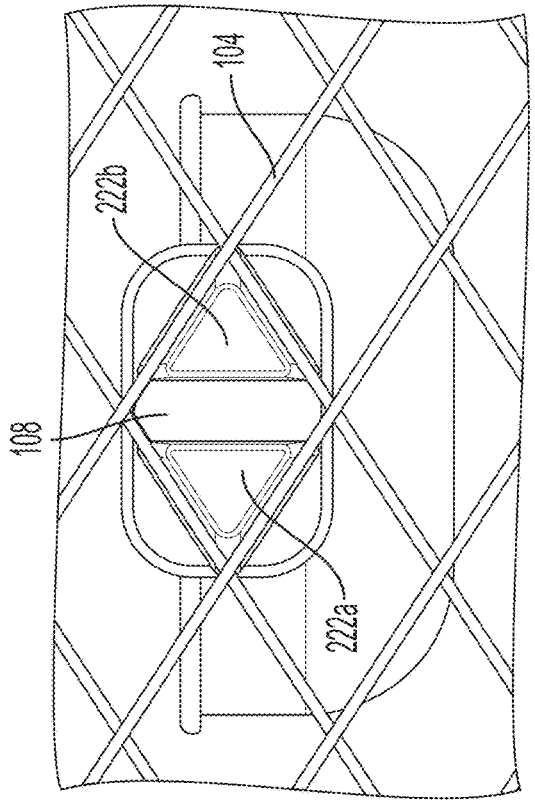
FIG. 4C is a front view of the attachment device of FIG. 2A during coupling to the animal crate of FIG. 1 according to certain aspects of the present disclosure.
Figure 4D:
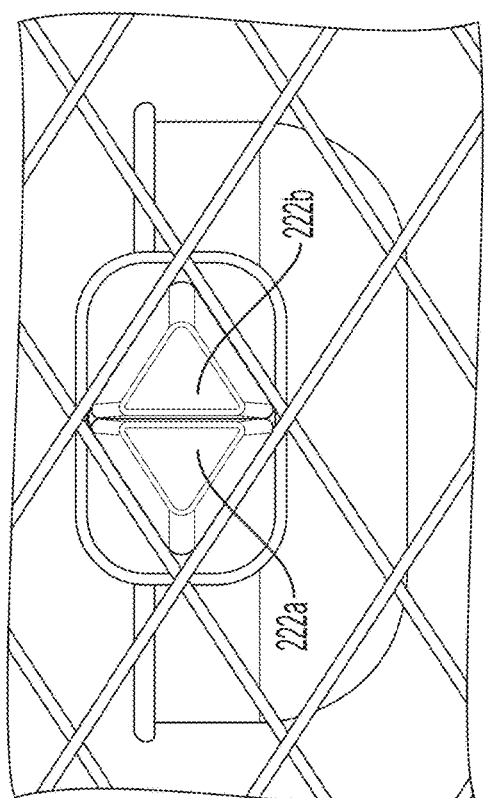
FIG. 4D is a front view of the attachment device of FIG. 2A after coupling to the animal crate of FIG. 1 according to certain aspects of the present disclosure.
Figure 5B:
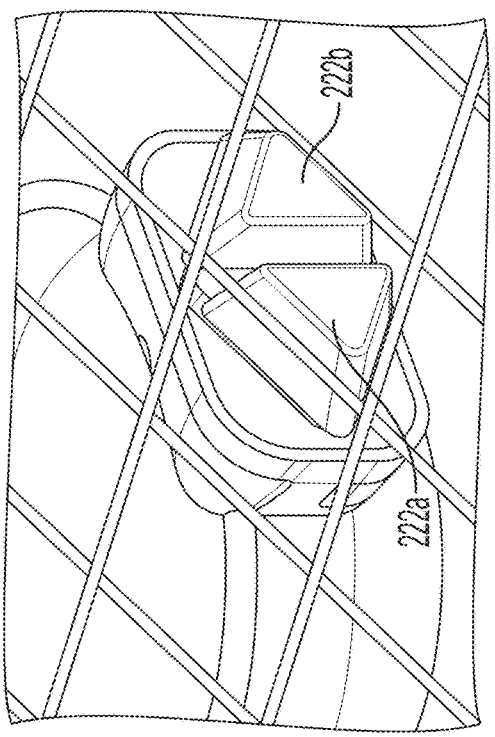
FIG. 5B is a perspective view of FIG. 4B according to certain aspects of the present disclosure.
Figure 5D:
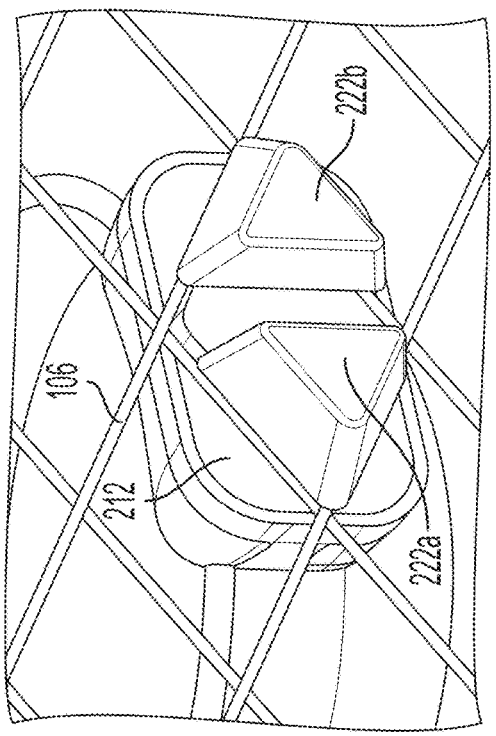
FIG. 5D is a perspective view of FIG. 4D according to certain aspects of the present disclosure.
Figure 5A:
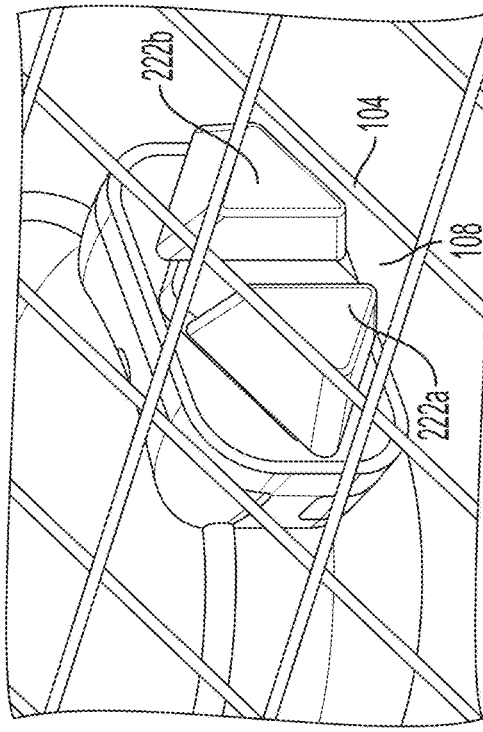
FIG. 5A is a perspective view of FIG. 4A according to certain aspects of the present disclosure.
Figure 5C:
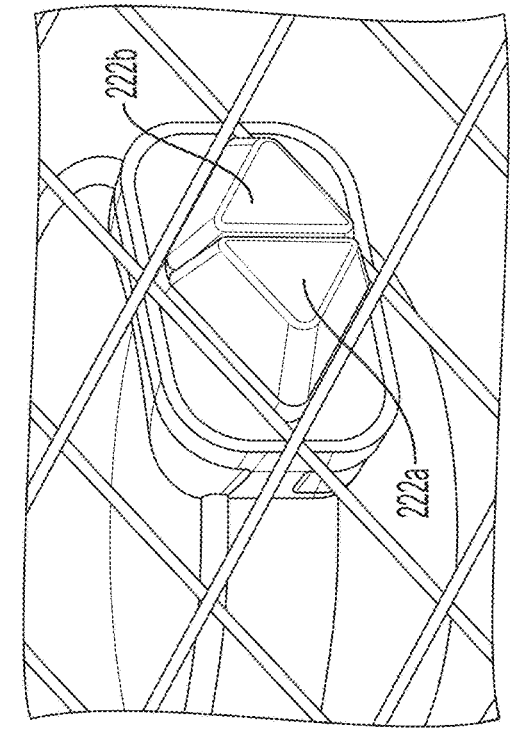
FIG. 5C is a perspective view of FIG. 4C according to certain aspects of the present disclosure.

In the fully-compressed insertion state, the first slider piece 222*a* and the second slider piece 222*b* may be fully inserted through the opening, as shown in FIGS. 4C and 5C. Once the first slider piece 222*a* and the second slider piece 222*b* are fully inserted through the opening 108, a spring force biases the first slider piece 222*a* and/or the second slider piece 222*b* from the insertion state to the expanded state, as shown in FIGS. 4D and 5D. The rod(s) 106 of the mesh network 104 are positioned between the spring-loaded crate attachment member 220 and the base member 212 to couple the attachment device 210 to the animal crate after the first slider piece 222*a* and the second slider piece 222*b* have been fully inserted through the opening 108.

Figure 6:
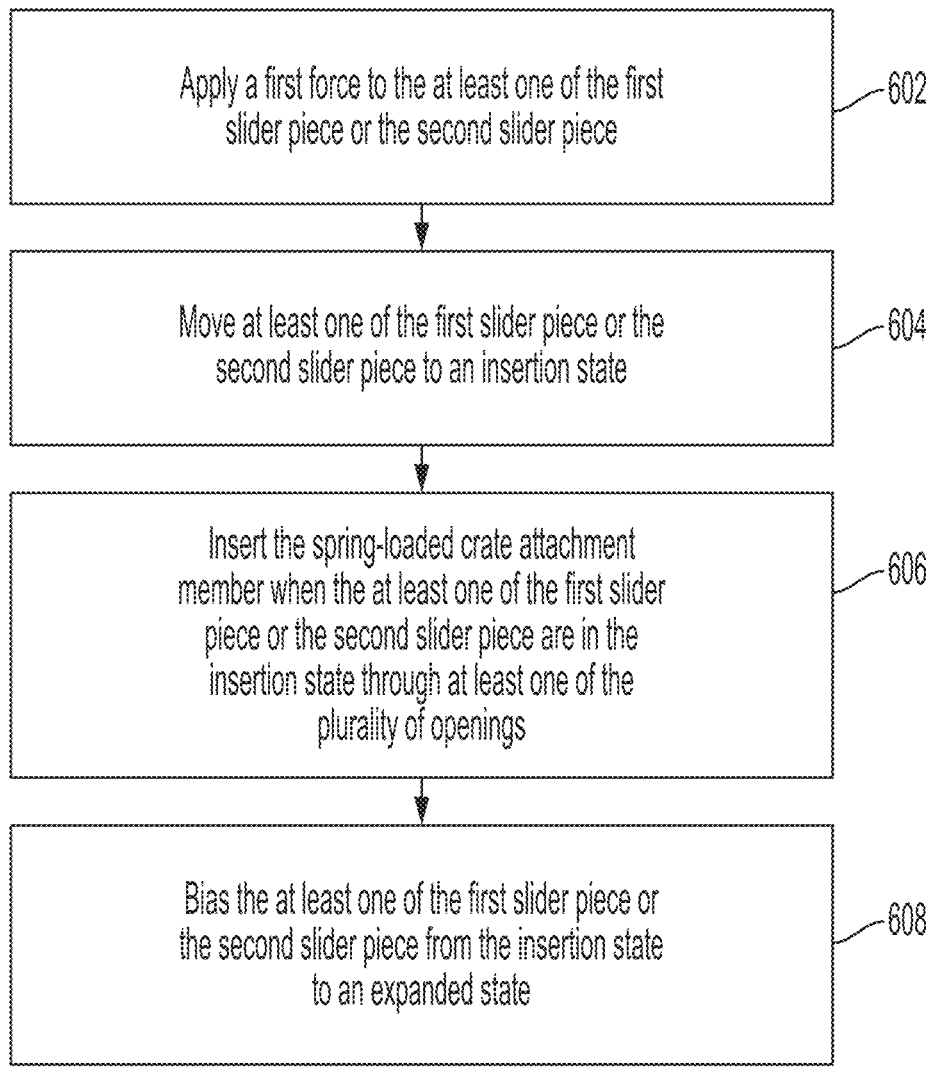
FIG. 6 is a flowchart for an example method for coupling an attachment device to an animal crate according to certain aspects of the present disclosure.

Referring now to FIG. 6, FIG. 6 shows an example method for coupling an attachment device, which may be the same or similar to the attachment device 210 described above with respect to FIGS. 2A-5D, to an animal crate, which may be the same or similar to the animal crate 100 described above with respect to FIG. 1, according to this disclosure. For example the animal crate has at least a portion of at least one wall formed from a mesh network having a plurality of openings and the attachment device includes a base member and a spring-loaded crate attachment member coupled to the base member. The spring-loaded crate attachment member includes a first slider piece and a second slider piece. The example method is discussed with respect to the animal crate 100 discussed relative to FIG. 1 and the attachment device 210 discussed relative to FIGS. 2A-5D.

At block 602, a first force is applied to at least one of the first slider piece 222*a* or the second slider piece 222*b*. A force may be applied by a user, which the spring-loaded crate attachment member 220 may convert to the first force.

At block 604, the at least one of the first slider piece 222*a* or the second slider piece 222*b* moves to an insertion state. The first force may cause the at least one of the first slider piece 222*a* or the second slider piece 222*b* to move toward each other into the insertion state. The force from the user that is needed to cause the first slider piece 222*a* or the second slider piece 222*b* to move to the insertion state may be small enough that the force may be applied by one hand of the user.

At block 606, the spring-loaded crate attachment member 220 is inserted through at least one of the openings 108 when the at least one of the first slider piece 222*a* or the second slider piece 222*b* are in the insertion state. The shape of the spring-loaded crate attachment member 220 may be the same as a shape of the openings 108. Once the spring-loaded crate attachment member 220 is inserted through at least one of the openings 108, the at least one of the first slider piece 222*a* or the second slider piece 222*b* may be biased from the insertion state to the expanded state such that at least one rod 106 of the mesh network 104 is positioned between and abuts the spring-loaded crate attachment member 220 and the base member 212 to couple the attachment device 210 to the animal crate 100.

At block 608, the at least one of the first slider piece 222*a* or the second slider piece 222*b* is biased from the insertion state to an expanded state after the first slider piece 222*a* or the second slider piece 222*ba* are fully inserted through opening 108. A spring force from springs 328*a-b* of the spring-loaded crate attachment member 220 can bias the first slider piece 222*a* or the second slider piece 222*b* from the insertion state to the expanded state.

In the following, further examples are described to facilitate the understanding of the invention (and in some aspects, features of an apparatus or system described in one or more of these examples may be utilized in a method described in one of the other examples or vice versa). These examples are not meant to be mutually exclusive, exhaustive, or restrictive; and the disclosure is not limited to these examples but rather encompasses all possible modifications and variations within the scope of the issued claims and their equivalents.

Example 1. An attachment device coupleable to an animal crate having at least a portion of at least one wall formed from a mesh network having a plurality of openings, the attachment device comprising: a base member; and a spring-loaded crate attachment member coupled to the base member and comprising a first slider piece and a second slider piece; wherein a first force is applicable to at least one of the first slider piece or the second slider piece to move the at least one of the first slider piece or the second slider piece to an insertion state; and wherein a spring force biases the at least one of the first slider piece or the second slider piece from the insertion state to an expanded state.

Example 2. The attachment device of Example 1 or any of the preceding or subsequent examples, wherein a shape of the spring-loaded crate attachment member substantially corresponds to a shape of at least one of the plurality of openings.

Example 3. The attachment device of Example 1 or any of the preceding or subsequent examples, wherein the spring-loaded crate attachment member is insertable through at least one of the plurality of openings when the at least one of the first slider piece or the second slider piece are in the insertion state.

Example 4. The attachment device of Example 1 or any of the preceding or subsequent examples, wherein the spring-loaded attachment member is spaced at a distance from the base member substantially equal to a width of a rod forming the mesh network.

Example 5. The attachment device of Example 1 or any of the preceding or subsequent examples, wherein a cross-section of a first portion of each of the first slider piece and the second slider piece is greater than a cross-section of a second portion of each of the first slider piece and the second slider piece.

Example 6. The attachment device of Example 5 or any of the preceding or subsequent examples, wherein the first portion is at a first end of each of the first slider piece and the second slider piece, the second portion is at a second end of each of the first slider piece and the second slider piece, and the first end is located closer to the base member than the second end.

Example 7. The attachment device of Example 1 or any of the preceding or subsequent examples, wherein the base member is coupleable to an animal crate enrichment device.

Example 8. A method (which may incorporate features of any of the preceding or subsequent examples) for coupling an attachment device to an animal crate having at least a portion of at least one wall formed from a mesh network having a plurality of openings, the attachment device comprising a base member and a spring-loaded crate attachment member coupled to the base member and comprising a first slider piece and a second slider piece, the method comprising: applying a first force to the at least one of the first slider piece or the second slider piece; moving at least one of the first slider piece or the second slider piece to an insertion state due to the application of the first force; and biasing the at least one of the first slider piece or the second slider piece from the insertion state to an expanded state due to a spring force.

Example 9. The method of Example 8 or any of the preceding or subsequent examples, wherein a shape of the spring-loaded crate attachment member substantially corresponds to a shape of at least one of the plurality of openings.

Example 10. The method of Example 8 or any of the preceding or subsequent examples, further comprising inserting the spring-loaded crate attachment member when the at least one of the first slider piece or the second slider piece are in the insertion state through at least one of the plurality of openings until the base member abuts at least one rod forming the mesh network.

Example 11. The method of Example 8 or any of the preceding or subsequent examples, wherein the spring-loaded attachment member is spaced at a distance from the base member substantially equal to a width of the at least one rod.

Example 12. The method of Example 8 or any of the preceding or subsequent examples, wherein a cross-section of a first portion of each of the first slider piece and the second slider piece is greater than a cross-section of a second portion of each of the first slider piece and the second slider piece.

Example 13. The method of Example 12 or any of the preceding or subsequent examples, wherein the first portion is at a first end of each of the first slider piece and the second slider piece, the second portion is at a second end of each of the first slider piece and the second slider piece, and the first end is located closer to the base member than the second end.

Example 14. The method of Example 8 or any of the preceding or subsequent examples, wherein the base member is coupleable to an animal crate enrichment device.

Example 15. An animal crate enrichment device coupleable to an animal crate having at least a portion of at least one wall formed from a mesh network having a plurality of openings, the animal crate enrichment device comprising: an attachment device comprising: a base member; and a spring-loaded crate attachment member coupled to the base member and comprising a first slider piece and a second slider piece; wherein a first force is applicable to at least one of the first slider piece or the second slider piece to move the at least one of the first slider piece or the second slider piece to an insertion state; and wherein a spring force biases the at least one of the first slider piece or the second slider piece from the insertion state to an expanded state.

Example 16. The animal crate enrichment device of Example 15 or any of the preceding or subsequent examples, wherein a shape of the spring-loaded crate attachment member substantially corresponds to a shape of at least one of the plurality of openings.

Example 17. The animal crate enrichment device of Example 15 or any of the preceding or subsequent examples, wherein the spring-loaded crate attachment member is insertable through at least one of the plurality of openings when the at least one of the first slider piece or the second slider piece are in the insertion state.

Example 18. The animal crate enrichment device of Example 15 or any of the preceding or subsequent examples, wherein the spring-loaded attachment member is spaced at a distance from the base member substantially equal to a width of a rod forming the mesh network.

Example 19. The animal crate enrichment device of Example 15 or any of the preceding or subsequent examples, wherein a cross-section of a first portion of each of the first slider piece and the second slider piece is greater than a cross-section of a second portion of each of the first slider piece and the second slider piece.

Example 20. The animal crate enrichment device of Example 15 or any of the preceding or subsequent examples, wherein the first portion is at a first end of each of the first slider piece and the second slider piece, the second portion is at a second end of each of the first slider piece and the second slider piece, and the first end is located closer to the base member than the second end.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An attachment device coupleable to an animal crate having at least a portion of at least one wall formed from a mesh network having a plurality of openings, the attachment device comprising:
    a base member comprising a first face; and
    a spring-loaded crate attachment member coupled to the base member proximate the first face and comprising a first slider piece and a second slider piece; wherein a cross-section of a first portion of each of the first slider piece and the second slider piece is greater than a cross-section of a second portion of each of the first slider piece and the second slider piece, and wherein the first portion is at a first end of each of the first slider piece and the second slider piece, the second portion is at a second end of each of the first slider piece and the second slider piece, and the first end is located closer to the base member than the second end; wherein a gap is arranged between the spring-loaded crate attachment member and the base member, and the gap is substantially equal to a width of a rod forming the mesh network;

wherein a first force is applicable to at least one of the first slider piece or the second slider piece to move the at least one of the first slider piece or the second slider piece in a first direction towards the other of the at least one of the first slider piece or the second slider piece to an insertion state;

wherein a spring force biases the at least one of the first slider piece or the second slider piece in a second direction opposite to the first direction from the insertion state to an expanded state;

wherein the first slider piece and the second slider piece are each movable relative to the base member along a plane parallel to the first face; and wherein the first slider piece and the second slider piece are insertable through at least one of the plurality of openings of the mesh network when the at least one of the first slider piece or the second slider piece are in the insertion state.

2. The attachment device of claim 1, wherein a shape of the spring-loaded crate attachment member matches a shape of at least one of the plurality of openings.

3. The attachment device of claim 1, wherein a height of each of the first slider piece and the second slider piece is less than a height of the first face.

4. The attachment device of claim 1, wherein at least a portion of the spring-loaded crate attachment member is arranged within an internal chamber of the base member.

5. The attachment device of claim 1, wherein the base member is coupleable to an animal crate enrichment device.

6. A method for coupling an attachment device to an animal crate having at least a portion of at least one wall formed from a mesh network having a plurality of openings, the attachment device comprising a base member comprising a first face and a spring-loaded crate attachment member coupled to the base member proximate the first face and comprising a first slider piece and a second slider piece, the method comprising:

applying a first force to the at least one of the first slider piece or the second slider piece;

moving at least one of the first slider piece or the second slider piece in a first direction towards the other of the at least one of the first slider piece or the second slider piece to an insertion state due to the application of the first force, wherein the first slider piece and the second slider piece are each movable relative to the base member along a plane parallel to the first face, and the first slider piece and the second slider piece are insertable through at least one of the plurality of openings of the mesh network when the at least one of the first slider piece or the second slider piece are in the insertion state; and biasing the at least one of the first slider piece or the second slider piece in a second direction opposite to the first direction from the insertion state to an expanded state due to a spring force; wherein a gap is arranged between the spring-loaded crate attachment member and the base member, and the gap is substantially equal to a width of a rod forming the mesh network; and wherein a cross-section of a first portion of each of the first slider piece and the second slider piece is greater than a cross-section of a second portion of each of the first slider piece and the second slider piece, and wherein the first portion is at a first end of each of the first slider piece and the second slider piece, the second portion is at a second end of each of the first slider piece and the second slider piece, and the first end is located closer to the base member than the second end.

7. The method of claim 6, wherein a shape of the spring-loaded crate attachment member matches a shape of at least one of the plurality of openings.

8. The method of claim 6, further comprising inserting the spring-loaded crate attachment member when the at least one of the first slider piece or the second slider piece are in the insertion state through at least one of the plurality of openings until the base member abuts the at least one rod.

9. The method of claim 6, wherein at least a portion of the spring-loaded crate attachment member is arranged within an internal chamber of the base member.

10. The method of claim 6, wherein the base member is coupleable to an animal crate enrichment device.

11. An animal crate enrichment device coupleable to an animal crate having at least a portion of at least one wall formed from a mesh network having a plurality of openings, the animal crate enrichment device comprising:

an attachment device comprising:
a base member comprising a first face; and
a spring-loaded crate attachment member coupled to the base member proximate the first face and comprising a first slider piece and a second slider piece;
wherein a cross-section of a first portion of each of the first slider piece and the second slider piece is greater than a cross-section of a second portion of each of the first slider piece and the second slider piece, and wherein the first portion is at a first end of each of the first slider piece and the second slider piece, the second portion is at a second end of each of the first slider piece and the second slider piece, and the first end is located closer to the base member than the second end; wherein a gap is arranged between the spring-loaded crate attachment member and the base member, and the gap is substantially equal to a width of a rod forming the mesh network;
wherein a first force is applicable to at least one of the first slider piece or the second slider piece to move the at least one of the first slider piece or the second slider piece to an insertion state, the first slider piece being a first distance from the second slider piece in the insertion state;
wherein a spring force biases the at least one of the first slider piece or the second slider piece from the insertion state to an expanded state, the first slider piece being a second distance from the second slider piece in the expanded state, the first distance being less than the second distance;
wherein the first slider piece and the second slider piece are each movable relative to the base member along a plane parallel to the first face; and
wherein the first slider piece and the second slider piece are insertable through at least one of the plurality of openings of the mesh network when the at least one of the first slider piece or the second slider piece are in the insertion state.

12. The animal crate enrichment device of claim 11, wherein a shape of the spring-loaded crate attachment member matches a shape of at least one of the plurality of openings.

13. The animal crate enrichment device of claim 11, wherein a height of each of the first slider piece and the second slider piece is less than a height of the first face.

14. The animal crate enrichment device of claim 11, wherein at least a portion of the base member is arranged within an internal chamber of the spring-loaded crate attachment member.

\* \* \* \* \*